(12) United States Patent
Matsubayashi

(10) Patent No.: US 6,954,279 B2
(45) Date of Patent: Oct. 11, 2005

(54) AUTOMATED OUTPUT OF USER GUIDE

(75) Inventor: Don Hideyasu Matsubayashi, Monterey, CA (US)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 09/207,143

(22) Filed: Dec. 8, 1998

(65) Prior Publication Data

US 2003/0090700 A1 May 15, 2003

(51) Int. Cl.$^7$ ............................. G06K 15/00; G06F 3/00
(52) U.S. Cl. ................... 358/1.15; 358/442; 717/174; 717/177; 713/1; 713/2; 709/250; 710/301
(58) Field of Search ................. 358/1.1–1.9, 1.11–1.18; 370/245, 254, 395.2, 407; 709/249, 250, 321–328; 710/8, 10, 62–65, 301, 104; 345/594, 661, 705, 709, 714, 716, 730; 717/103, 168–178; 713/1, 2

(56) References Cited

U.S. PATENT DOCUMENTS

| | | | |
|---|---|---|---|
| 5,325,532 A | * 6/1994 | Crosswy et al. | 713/2 |
| 5,345,314 A | 9/1994 | Ho-Il | 358/296 |
| 5,363,204 A | 11/1994 | Millman | 358/406 |
| 5,550,958 A | 8/1996 | Hattori | 395/115 |
| 5,559,951 A | 9/1996 | Lentz et al. | 395/163 |
| 5,596,723 A | * 1/1997 | Romohr | 395/200.16 |
| 5,734,804 A | 3/1998 | Bergner | 395/113 |
| 5,870,767 A | * 2/1999 | Kraft, IV | 707/501 |
| 5,974,474 A | * 10/1999 | Furner et al. | 710/8 |
| 6,083,007 A | * 7/2000 | Joliat et al. | 434/262 |
| 6,128,263 A | * 10/2000 | Fujii et al. | 369/54 |
| 6,131,040 A | * 10/2000 | Knuutila et al. | 455/550 |
| 6,272,127 B1 | * 8/2001 | Golden et al. | 370/352 |
| 6,366,966 B1 | * 4/2002 | Laney et al. | 710/18 |
| 6,529,992 B1 | * 3/2003 | Thomas et al. | 711/1 |

OTHER PUBLICATIONS

"Document Centre 220/230 System Administration Guide", Xerox Corporation, p. 1–24, 1997.
"Document Centre 220/230 Setup Guide", Xerox Corporation, p. 76, 1997.
"HP LaserJet 6P/6MP Printer User's Manual", Hewlett–Packard Company, pp. 2–8 to 2–13, 1997.
Sample of Start Page for Document Centre 220/230, 1998.

* cited by examiner

Primary Examiner—King Y. Poon
(74) Attorney, Agent, or Firm—Fitzpatrick, Cella, Harper & Scinto

(57) ABSTRACT

An interface card for a device with image output capabilities. The interface card includes a connector for connecting to the device and a controller. The controller sends data for output of an image of a quick-start guide from the interface card to the device through the connector. The controller sends the data once without error and does not send the data to the device again unless the interface card is reset with respect to whether the data has been sent. In the preferred embodiment, the interface card further includes a non-volatile memory, and the controller stores an indication that the data has been sent without error in the non-volatile memory in a case that the data has been sent without error. The controller uses the indication to determine if the data has been sent once without error, and the interface card is reset with respect to whether the data has been sent by resetting the indication. Examples of interface cards according to the invention include, but are not limited to, CD-ROM and DVD cards for computer systems with displays and/or printers, display interface cards, and network interface cards for printers.

24 Claims, 12 Drawing Sheets

AUTOMATED OUTPUT OF USER GUIDE

BACKGROUND OF THE INVENTION

1. Field of the Invention

The present invention concerns automatically sending data for output of an image of a user guide that informs a user how to configure an interface card that is installable in a device with image output capabilities. More particularly, the invention concerns an interface card that automatically sends such data.

2. Description of the Related Art

Interface cards are often installed in devices with image output capabilities so as to interface those devices to networks or other devices. For example, a network interface card is installed in a printer so as to interface the printer to a network. Likewise, a DVD interface card or CD-ROM interface card is installed in a computer system so as to interface the computer system to a DVD drive or a CD-ROM drive, thereby allowing the computer system to output images stored on DVD disks and CD-ROMs. As yet a further example, a display interface card such as a graphics accelerator card is installed in a computer so as to provide an improved interface to a display. Other examples of such interface cards exist.

When interface cards are installed by a manufacturer in a device, the manufacturer can easily check to see if the card is installed and configured properly. However, when an end user installs an interface card, the end user must make sure that the card is installed and configured properly. Problems are often encountered in this process, particularly by end users who are not familiar with the installation procedures. In addition, if the card does not work properly once it is installed, the user has little way of knowing if the problem is with the configuration of the card or the connection between the card and the device.

SUMMARY OF THE INVENTION

Accordingly, what is needed is an interface card that immediately provides help to a user when the card is first installed in a device and that informs the user if the card is properly connected to the device.

The invention addresses the foregoing need in situations where the interface card is installed in a device that has printing or other image output capabilities, such as a printer, copier, facsimile machine, display, dumb terminal, or computer that has one or more of these devices connected thereto. Examples of interface cards for such devices with image output capabilities include network interface cards (NICs), DVD interface cards, CD-ROM interface cards, display interface cards, and memory cards.

According to the invention, an interface card that is connectable to a device with image output capabilities includes a controller that sends data for output of an image of a quick-start guide to the device, with the controller sending the data once without error. After a user first installs the card in the device, the data is sent to the device. Based on the data, the device outputs an image of the quick-start guide using its image output capabilities.

By the simple fact that the image of the guide has been output, the user is assured that the interface card has been properly connected to the device. Moreover, the content of the guide itself provides immediate help to the user as to how to configure the card, as well as the answers to any other applicable help included in the guide.

Accordingly, in one aspect the invention is an interface card for a device with image output capabilities. The card includes a controller and a connector for connecting to the device. The controller sends data for output of an image of a quick-start guide from the interface card to the device through the connector. The controller sends that data once without error after the card is installed in the device. In the preferred embodiment, the data is sent in response to initial power application to the interface card, after any POST (power-on self-testing) operations are performed.

The card also preferably includes a non-volatile memory (such as EEPROM or NVRAM) that stores an indication that the data has been sent to the device without error. The controller uses this indication to determine if the data has been sent without error, thereby ensuring that the data for output of the image of the quick-start guide is not sent again unless the interface card is reset with respect to sending the data. In the preferred embodiment, the card may be reset in this respect by resetting the indication in the non-volatile memory that the data has been sent, such as through a "flash" operation that is performed to reconfigure the firmware in the non-volatile memory.

The quick-start guide preferably provides installation and configuration instructions and information to the user. Preferably, the quick-start guide is written so as to allow a user that is not familiar with installation of interface cards to complete the installation and configuration of the card quickly.

The interface card preferably can detect information about a device to which it is attached. As a result, the card can modify the data for output of the image of the quick-start guide in accordance with the detected information. The data can be modified based on information such as a status, type, model or manufacturer of the device. For example, if the image output device is a printer, the card can detect if the printer is of a type that can output color images. If the printer can output color images, the interface card can modify the quick-start guide to include color images. On the other hand, if the printer cannot output color images, the interface card can modify the quick-start guide to include greyscale or black/white images rather than color images.

In another aspect, the invention is an interface card for a device with image output capabilities. The interface card includes a connector for connecting to the device, a memory for storing data for output of an image of a quick-start guide, and a non-volatile memory (such as EEPROM or VRAM) for storing an indication of whether or not the data has been sent without error to the connector. The card also includes a controller for (1) sending the data to the connector in a case that the indication stored in the non-volatile memory indicates that the data has not been sent without error, and (2) storing the indication that the data has been sent without error in a case that the data has been sent without error to the connector. In the preferred embodiment, the controller also detects if the data is sent without error.

By virtue of the foregoing arrangement, the interface card sends data for output of the image of the quick-start guide to the device once, for example when the card is first installed in the device and powered on. The image of the quick-start guide is output by the device based on this data, thereby providing immediate help to a user that is installing the card. In addition, the user is assured that the card and the device are properly connected to each other.

One example of an interface card in accordance with the invention is a network interface card (NIC) that connects a printer to a network. When the NIC is first installed in the printer and the printer is powered on, the NIC sends a print job containing data for output of an image of the quick-start guide to the printer. If the data is sent without error, the data is not sent again unless the NIC is reset with respect to whether the data has been sent.

With this arrangement, the printer outputs the image of the quick-start guide, in this case in the form of a printout. The output of the image of the quick-start guide confirms to the user that the NIC is installed properly in the printer. The actual content of the quick-start guide provides configuration help to the user.

Another example of an interface card in accordance with the invention is a DVD interface card or CD-ROM interface card that connects a computer system having a display or other image output device (i.e., image output capabilities) to a DVD drive or CD-ROM drive. When the card is installed and powered on, the controller in the card sends a signal to the computer system that ordinarily would be sent when a CD-ROM has been inserted into a CD-ROM drive connected to the CD-ROM interface card. In response, the computer system typically sends a request for a filename for an executable program stored on what appears to the computer system to be a newly-inserted CD-ROM. The controller intercepts this request and then responds by sending a filename for an executable program that resides in the CD-ROM interface card. When the computer sends a request for the executable program, the controller also intercepts this request. The controller sends the executable program from the CD-ROM interface card to the computer system in response to the intercepted request for the executable program.

When the computer system executes the executable program, the executable program causes the computer system to output an image of the quick-start guide. The image can be output either through a display or through some other image output device (e.g., a printer) that is connected to the computer. The output of the image confirms to the user that the DVD or CD-ROM interface card is properly installed and provides help to the user, for example configuration help for the card.

Yet another example of an interface card in accordance with the invention is a display interface card, such as a graphics accelerator card, that connects a computer system to a display. When the display interface card is first installed in the computer system and the computer system is powered on, the display interface card sends data such as RGB pixel and synch information to the display for outputting an image of the quick-start guide. The output of the image confirms to the user that the display interface card is properly installed and provides help to the user, for example configuration help for the card.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

First Embodiment

Figure 1:
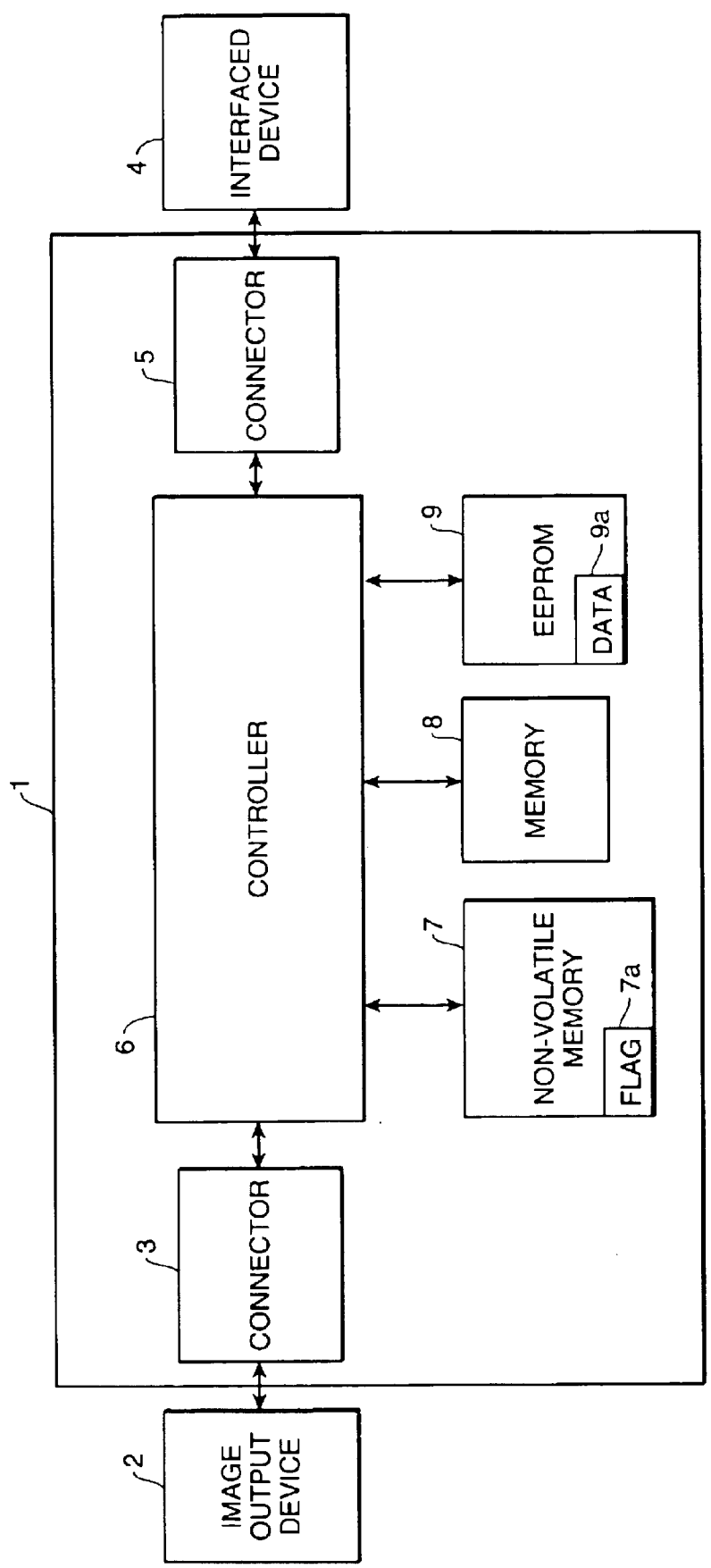
FIG. 1 is a block diagram showing an interface card according to the invention.

FIG. 1 is a block diagram showing an interface card according to the invention. The interface card includes at least a connector for connecting to an image output device and a controller. The interface card preferably also includes a memory for storing data for output of an image of a quick-start guide and a non-volatile memory for storing an indication of whether or not the data has been sent without error to the connector.

Interface card 1 provides an interface between image output device 2 that is connected to connector 3 and interfaced device 4 that is connected to connector 5. Interface card 1 can be physically inserted into image output device 2 or into interfaced device 4, or interface card 1 can be part of a separate stand-alone device.

Image output device 2 is any device capable of outputting images. The images can be output as displayed images, printed images, or any other type of images. Examples of image output device 2 include, but are not limited to, printers, copiers, facsimile machines, displays, dumb terminals, or computers that have one or more of these devices connected thereto.

Controller 6 of interface card 1 is connected to connector 3 and connector 5, for example through an internal bus (not shown). Controller 6 sends data for outputting a quick-start guide to image output device 2 through connector 3, as explained in more detail below.

Controller 6 also is connected to non-volatile memory 7, memory 8 and EEPROM 9. Non-volatile memory 7 is provided for storing an indication such as flag 7a that the data for the quick-start guide has been sent. Firmware including configuration information for interface card 1 also preferably is stored in non-volatile memory 7.

The non-volatile memory preferably is an NVRAM or an EEPROM. Unless the non-volatile memory is reset, an indication stored in non-volatile memory 7 remains in the non-volatile memory even between power cycles.

In the case that non-volatile memory 7 is an NVRAM, the non-volatile memory can be reset by reloading the NVRAM so as to update the firmware stored therein. In the case that non-volatile memory 7 is an EEPROM, the non-volatile memory can be reset through a "flash" operation which likewise is performed to update the firmware for interface card 1.

Memory 8 provides memory for use by controller 6 during any operations that controller 6 must perform. EEPROM 9 stores instructions for use by controller 6 and stores data 9a for output of an image of the quick-start guide according to the invention.

Interface card 1 includes other components specific to the type of interface provided by the card, for example interface controllers for controlling interfaces to image output device 2 and interfaced device 4. Examples of different types of interface cards according to the invention and their corresponding components are explained below with reference to FIGS. 3 through 13.

Figure 2:
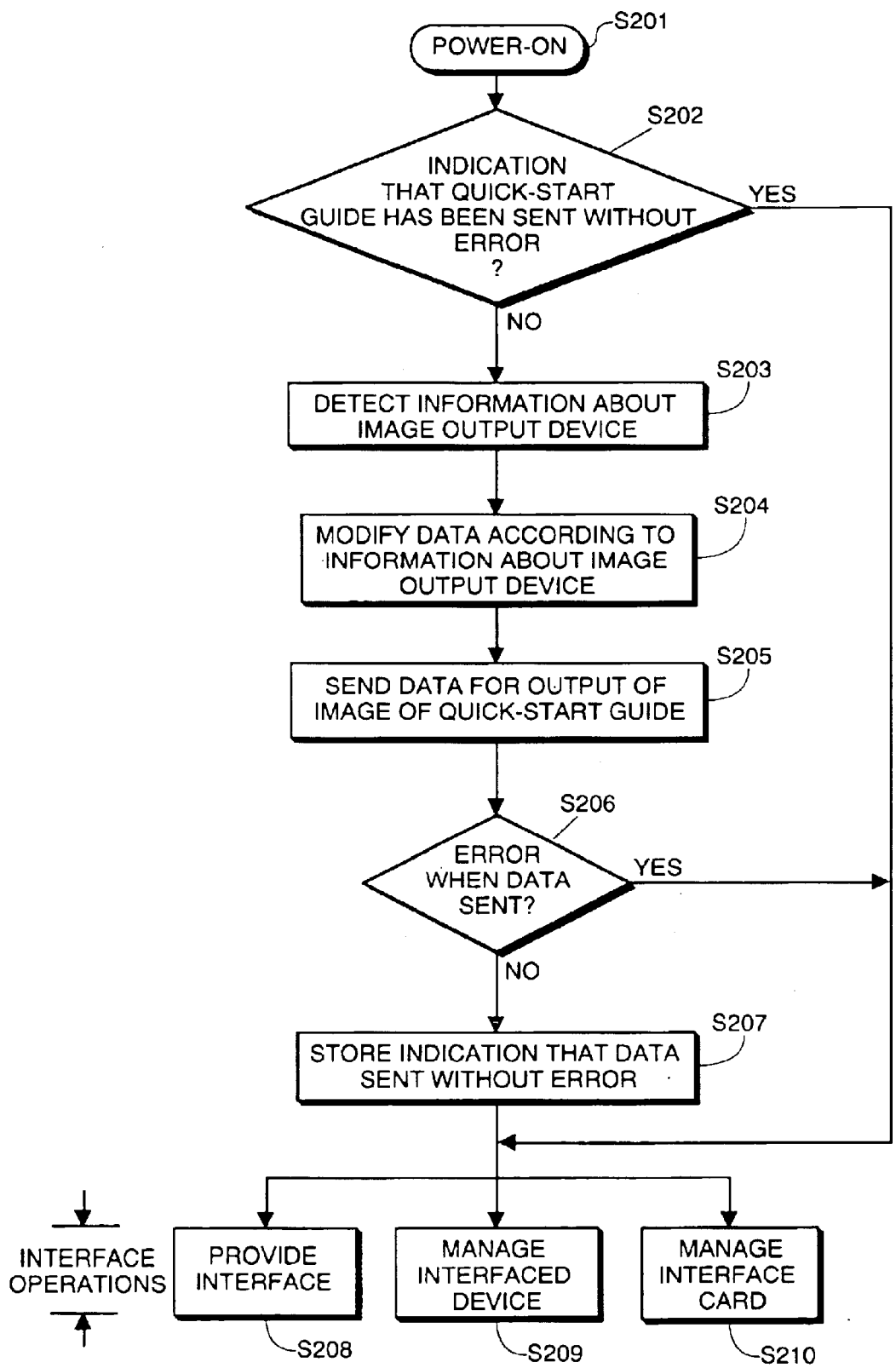
FIG. 2 is a flowchart for explaining the operation according to the invention of an interface card such as the interface card shown in FIG. 1.

FIG. 2 is a flowchart for explaining the operation of interface card 1 shown in FIG. 1.

Briefly, the controller of the interface card sends the data for output of an image of a quick-start guide from the interface card to the device through the connector. The data is sent once without error after the card is installed in the device, unless the interface card is reset with respect to whether the data has been sent. If the interface card is reset in this respect, the data is sent again. In the preferred embodiment, the controller stores an indication in the non-volatile memory that the data has been sent without error in a case that the data has been sent without error, and the controller uses the indication to determine if the data has been sent once without error. The interface card is reset with respect to whether the data has been sent by resetting the indication.

In more detail, in step S201, the device from which the interface card receives power is powered on. The interface card can receive power from image output device 2 through connector 3, from interfaced device 4 connected to connector 5, or from some other source. Once the interface card receives power and after any power-on self-test (POST) operations, controller 6 accesses non-volatile memory 7 in step S202.

The controller determines in step S202 whether the non-volatile memory contains an indication that the data for output of an image of the quick-start guide has been sent from the interface card. If such an indication is present in non-volatile memory 7, then flow proceeds to steps S208 through S210 at the end of the flowchart, and interface card 1 performs its normal interface functions. If such an indication is not present, flow proceeds to step S203.

Controller 6 preferably detects information about image output device 2 in step S203. Based on this information, controller 6 in step S204 modifies the content of the data for the quick-start guide in EEPROM 9 and saves the modified data in memory 8. The data can be modified based on information such as a status, type, model or manufacturer of the device. For example, if image output device 2 is a printer, interface card 1 can detect whether the printer is of a type that is capable of outputting color images. If the printer is capable of outputting color images, controller 6 can modify the data so that the image of the quick-start guide includes color images. Likewise, if the printer is not capable of outputting color images, controller 6 can modify the data so that the image only includes greyscale or black/white images.

In step S205, the data for output of an image of the quick-start guide is read from memory 8 and sent to connector 3 by controller 6. If interface card 1 is properly connected to image output device 2, the data is received by image output device 2, and an image of the quick-start guide is generated from the data by image output device 2.

The form of the data depends on the type of image output device 2 connected to interface card 1. For example, if image output device 2 is a printer, the data preferably is in the form of a print job. If image output device 2 is a computer system with a display or printer attached thereto, the data preferably is in the form of an executable program that generates image output using the display or printer. If image output device 2 is a display, the data preferably is in the form of RGB and synch information for generating an image on the display. Each of these foregoing examples is explained in greater detail below. Other possible forms for the data exist.

The simple fact that an image of the quick-start guide is output by image output device 2 confirms to the user that interface card 1 is properly connected to image output device 2. In addition, the content of the image of the quick-start guide preferably provides installation and configuration instructions and information to the user. Preferably, the quick-start guide is written so as to allow a user that is not familiar with installation of interface cards to complete the installation and configuration of the card quickly.

After the data for output of an image of the quick-start guide is sent to connector 3, controller 6 in step S206 preferably determines if the data was sent to connector 3 without error. For example, if connector 3 is not connected to any image output device, an error would most likely result from the attempt to send data to connector 3. If an error is detected, flow branches to steps S208 through S210, skipping step S207. As a result, the data for output of an image of the quick-start guide is sent again the next time interface card 1 is powered on.

If no error is detected, flow proceeds to step S207. In step S207, an indication that the data has been sent to connector 3 without error is stored as flag 7a in non-volatile memory 7. Flow then proceeds to steps S208 through S210.

The interface card in steps S208 through S210 performs its normal interface functions. These steps preferably occur in parallel.

In step S208, the interface card provides an interface between image output device 2 and interfaced device 4. In step S209, interface card 1 manages interfaced device 4. For example, interface card 1 might modify queues served by the device, alter the device's network name, or modify a default configuration for the device.

In step S210, interface card 1 is itself managed, such as by changing the configuration of the card or its network address. The management of interface card 1 includes changing configuration information for the interface card. The configuration information preferably is changed though flashing or reloading non-volatile memory 7. If flag 7a is reset by this flashing or reloading operation, interface card 1 is reset with respect to whether data for output of an image of a quick-start guide has been sent. As a result, the next time interface card 1 is powered on, data for output of an image of the quick-start guide is again sent to image output device 2.

In alternative embodiments, EEPROM 9 is replaced with a regular ROM, or controller 6 is hard-wired for controlling the interface card and EEPROM 9 is omitted. In other embodiments, non-volatile memory 7 and EEPROM 9 are combined into a single NVRAM or EEPROM.

Second Embodiment

Figure 3:
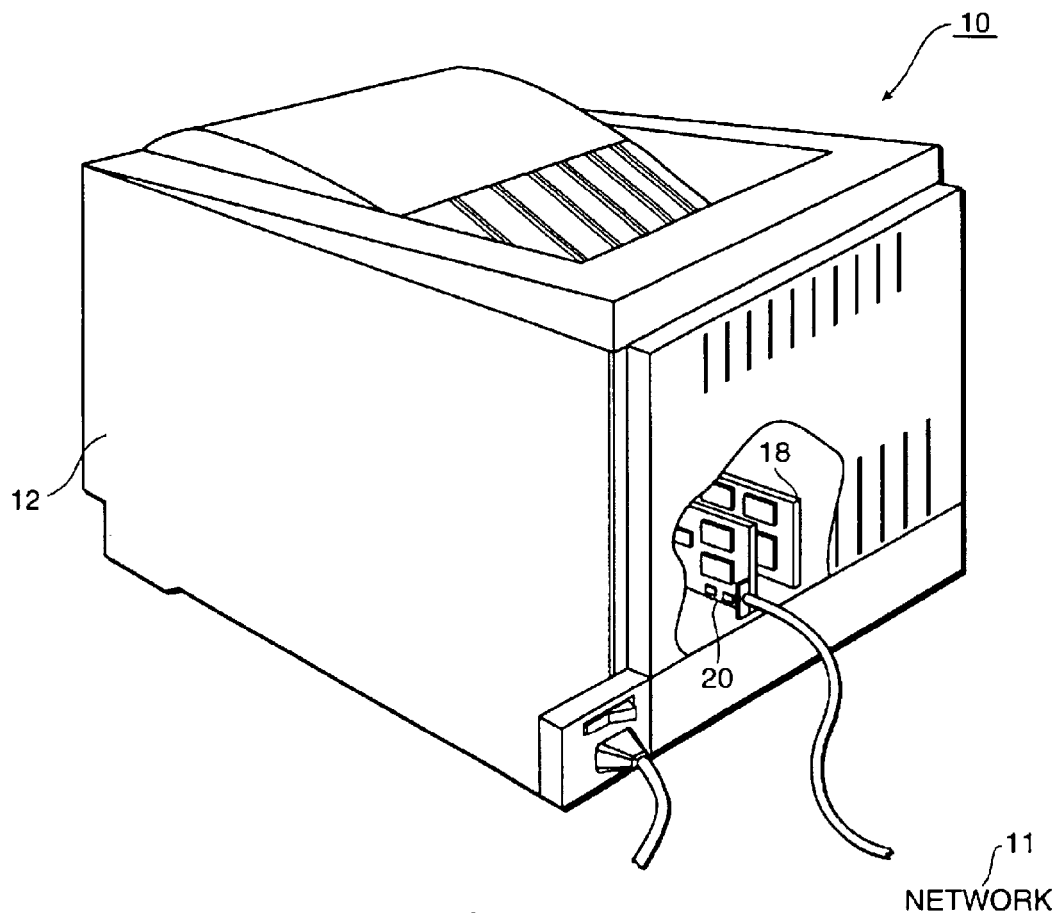
FIG. 3 is a representational view of a printer which is interfaced to a network by a network interface card according to the invention and through which the network interface card can output an image of a quick start guide.

FIG. 3 is a representational view of printer 10 which is interfaced to network 11 by a network interface card according to the invention and through which the network interface card can output an image of a quick start guide. As shown in FIG. 3, printer 10 includes housing 12 which provides a protective cover for printer 10. Disposed inside housing 12 is a print engine that typically includes a photosensitive drum, a laser, an image developing device, and an image transfer device. Also preferably disposed within housing 12 are printer controller 18 and network interface card 20 that is connected to printer controller 18.

In operation, a print job is received from network 11, which is preferably a local area network such as an Ethernet network, through network interface card 20. This print job is sent to printer controller 18. Under control of printer controller 18, the laser forms a latent image on the photosensitive drum based on the print job. This latent image is developed into a toner image by the developing device, and the toner image is transferred by the transfer device to a recording medium such as paper.

Although printer 10 is shown as a laser printer, any other type of printer or other device that generates printed output can utilize the network interface card according to the invention. Examples of such devices include, but are not limited to, ink jet printers, copiers, facsimile machines, and the like.

Figure 4:
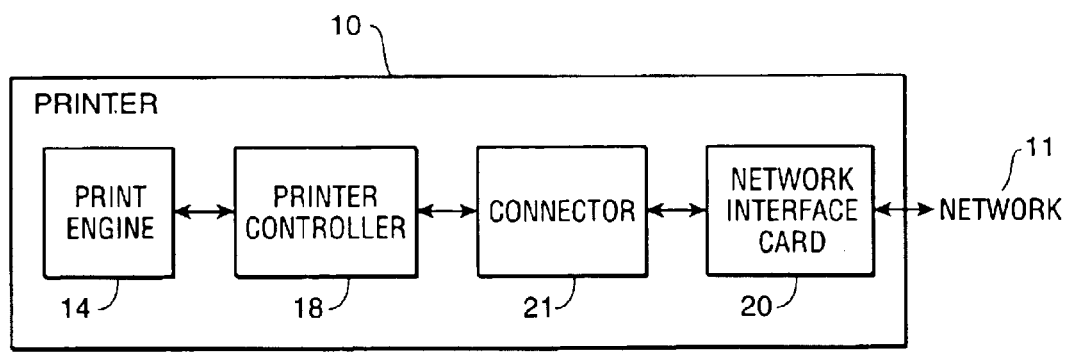
FIG. 4 is a block diagram of the printer shown in FIG. 3.

FIG. 4 is a simplified block diagram showing printer 10 connected to network 11 through network interface card 20. As shown in FIG. 4, printer 10 includes print engine 14 for outputting images onto a recording medium. Print engine 14 is controlled by printer controller 18, and printer controller 18 is functionally connected to connector 21 such as by a bus. Network interface card 20 according to the invention is connected to printer 10 through connector 21.

Network interface card 20 preferably is installed in printer 10 and connects printer 10 to network 11. In the preferred embodiment, network interface card 20 provides device-specific services, such as job buffering and spooling, as well as management services to printer 10. In addition, network interface card 20 automatically sends data for output of a quick-start guide to printer 10 once without error, as discussed below.

Figure 5:
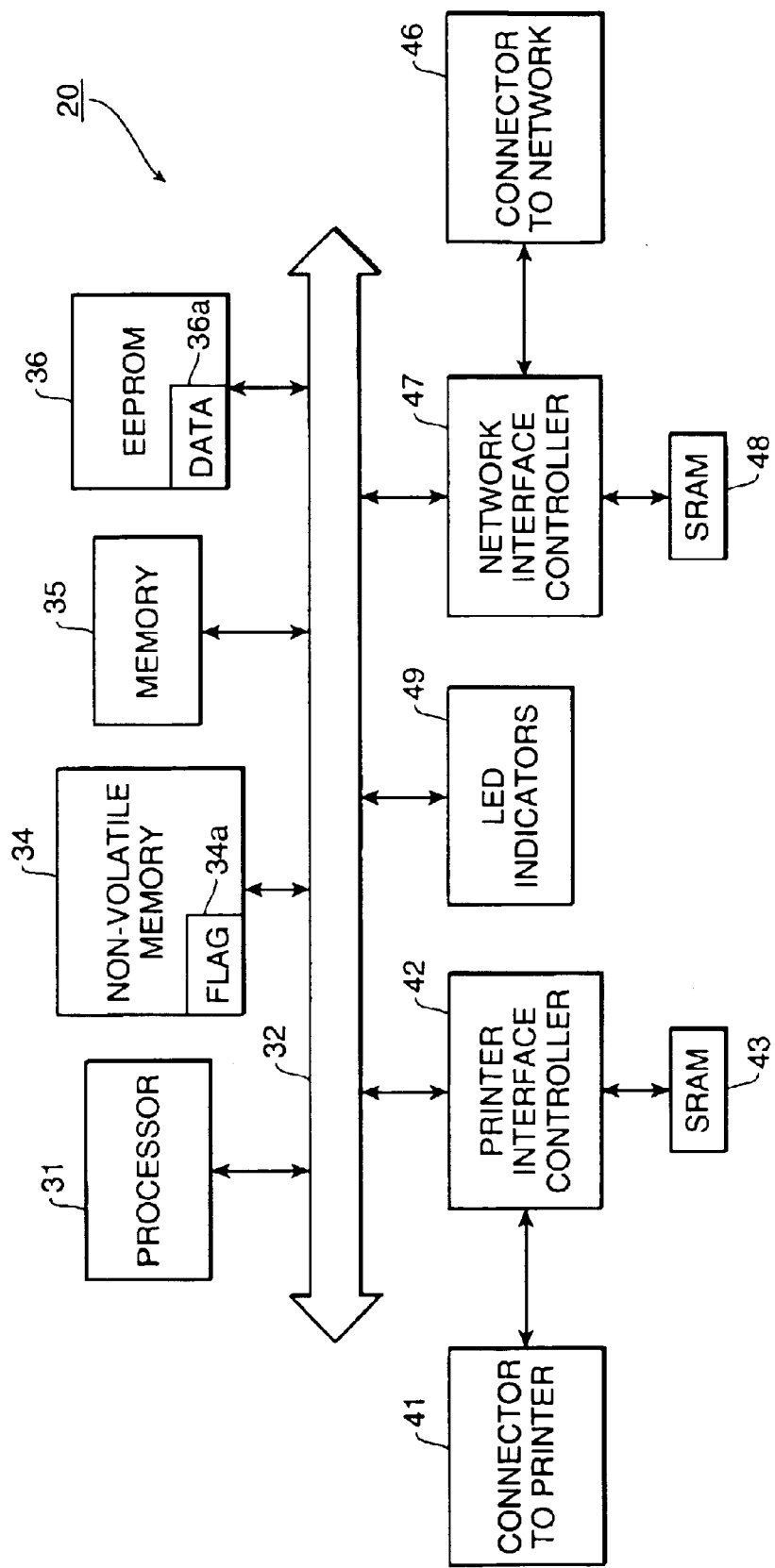
FIG. 5 is a block diagram of a network interface card according to the invention that interfaces a printer to a network.

FIG. 5 is a block diagram of network interface card 20 according to the invention for interfacing printer 10 to network 11. As shown in FIG. 5, network interface card 20 includes processor 31 such as an Intel 80188 8-bit programmable microprocessor which is interfaced to bus 32. This processor serves to provide the functionality needed to interface printer 10 to network 11. For example, processor 31 controls print buffering and spooling. In addition, processor 31 serves as the controller for controlling output of data for an image of a quick-start guide according to the invention.

Also interfacing with bus 32 are non-volatile memory 34, memory 35, and EEPROM 36. Configuration parameters are stored in non-volatile memory 34, as well as an indication of whether data for output of an image of a quick-start guide has been sent from the network interface card. This indication preferably is stored as flag 34a in non-volatile memory 34. Other information that must be preserved when the card is powered off also is stored in non-volatile memory 34.

Process steps for execution by processor 31 are stored in EEPROM 36, but in general, those process steps are loaded into and executed out of memory 35. In addition, data 36a for output of the image of the quick-start guide also preferably is stored in EEPROM 36, and data 36a is loaded into memory 35 before being sent to connector 41 by processor 31.

Connector 41 provides a connection to printer 10. The interface between network interface card 20 and printer 10 is controlled by printer interface controller 42. This controller may be of any of a variety of different controllers and can be bi-directional (e.g., an IEEE 1284 interface, a dual port RAM interface, and the like) or uni-directional (e.g., a Centronix RS-232 interface). Static random access memory (SRAM) 43 provides temporary storage for buffering messages sent to and from printer 10.

Connector 46 provides a connection to network 11. This connection is controlled by network connection controller 47, which handles encoding and decoding network traffic for network interface card 20. SRAM 48 provides temporary storage of network data (e.g., network packets) sent to and from network interface card 20.

LED indicators 49 also are interfaced to bus 32 and are used to provide some feedback information to a user about the status of network interface card 20.

Figure 6:
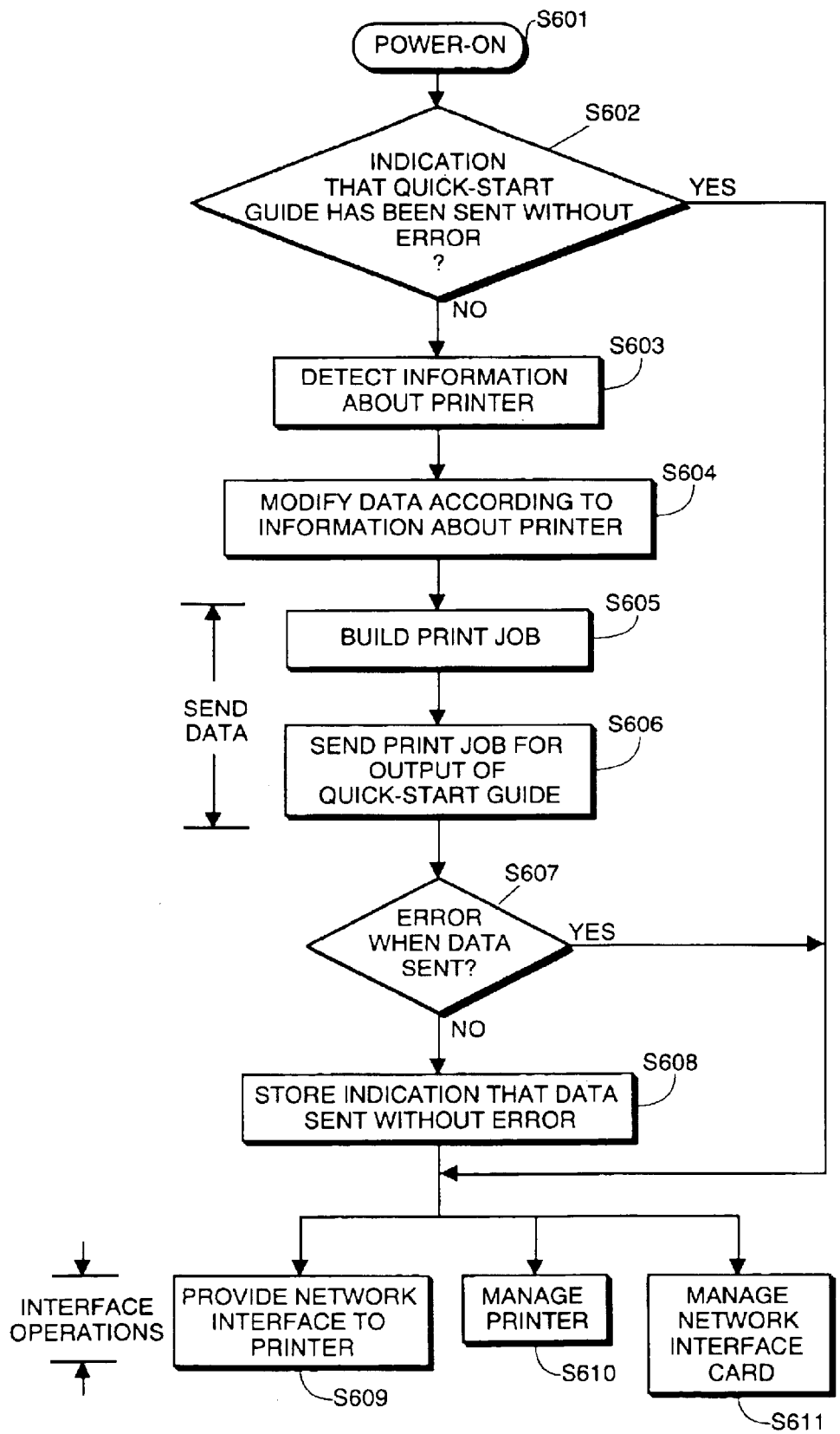
FIG. 6 is a flowchart for explaining the operation according to the invention of the network interface card shown in FIG. 5.

FIG. 6 is a flowchart for explaining the operation of network interface card 20 when sending data for output of an image of a quick-start guide by printer 10. In step S601, printer 10 is powered on, thereby providing power to network interface card 20. In step S602, after any POST operations, processor 31 accesses non-volatile memory 34 so as to determine if data for output of an image of a quick-start guide has been sent to connector 41, and thus to printer 10. Processor 31 determines if the data has been sent by checking for an indication such as flag 34a in non-volatile memory 34. If such an indication exists, flow proceeds to the interface operations at the end of the flowchart, namely steps S609 through S611. If such an indication does not exist, flow proceeds to step S603.

In step S603, processor 31 preferably detects information about printer 10 through connector 41. This information can include the status, type, model and/or manufacturer of printer 10. In step S604, processor 31 modifies data 36a based on the detected information.

For example, if processor 31 detects that printer 10 is a color printer, processor 31 can modify data 36a to include data for outputting color images. On the other hand, if processor 31 detects that printer 10 is not a color printer, processor 31 can modify data 36a to include data for outputting greyscale or black/white images instead of color images.

In steps S605 and S606, processor 31 sends data 36a for output of an image of a quick-start guide to connector 41 through printer interface controller 42. In order to send the data, in step S605 processor 31 preferably builds a print job in memory 35 from data 36a for the quick-start guide stored in EEPROM 36. Then, in step S606, processor 31 send the print job to printer interface controller 42, which in turn sends the print job through connector 41 to printer 10.

The print job can include any number of printed pages, possibly modified as discussed above based on the status, type, model, and manufacturer of printer 10. However, as the image is of a quick-start guide, the print job should be relatively short. In the preferred embodiment, the quick-start guide includes networking information for connecting printer 10 to network 11 through network interface card 20.

Next, processor 31 in step S607 determines if the print job was sent to printer 10 without error. In the preferred embodiment, printer interface controller 42 handles any error conditions that occur when sending the print job and reports to processor 31 whether the print job was sent without error. If the print job was sent without error, flow proceeds to step S608. Otherwise, if an error occurred, flow branches to steps S609 through S611, skipping step S608. As a result, the data for output of an image of the quick-start guide is sent again the next time network interface card 20 is powered on.

In step S608, processor 31 stores an indication such as flag 34a that the print job was sent without error. This indication is stored in non-volatile memory 34. As a result, the next time network interface card 20 is powered on, flow proceeds from step S602 to steps S609 through S611, unless the indication is reset in step S611 discussed below.

After step S608, flow proceeds to steps S609 through S611, which preferably occur in parallel. In steps S609 through S611, network interface card 20 performs normal interface operations.

In more detail, in step S609, network interface card 20 provides printer 10 with an interface to network 21. This interface allows printer 10 to communicate with network 21, for example for receiving print jobs and for reporting printer status.

In step S610, network interface card 20 manages printer 10. For example, network interface card 20 might modify queues served by the printer, alter the printer's network name, or modify a default configuration for the printer. In step S611, network interface card 20 is itself managed, such as by changing the configuration of the network interface card or its network address.

The management of network interface card 20 in step S611 includes changing configuration information for the network interface card. The configuration information preferably is changed though flashing or reloading non-volatile memory 34. If flag 34a is reset by this flashing or reloading operation, network interface card 20 is reset with respect to whether data for output of an image of a quick-start guide has been sent. As a result, the next time network interface card 20 is powered on, data for output of an image of the quick-start guide is again sent to printer 10.

Third Embodiment

Figure 7:
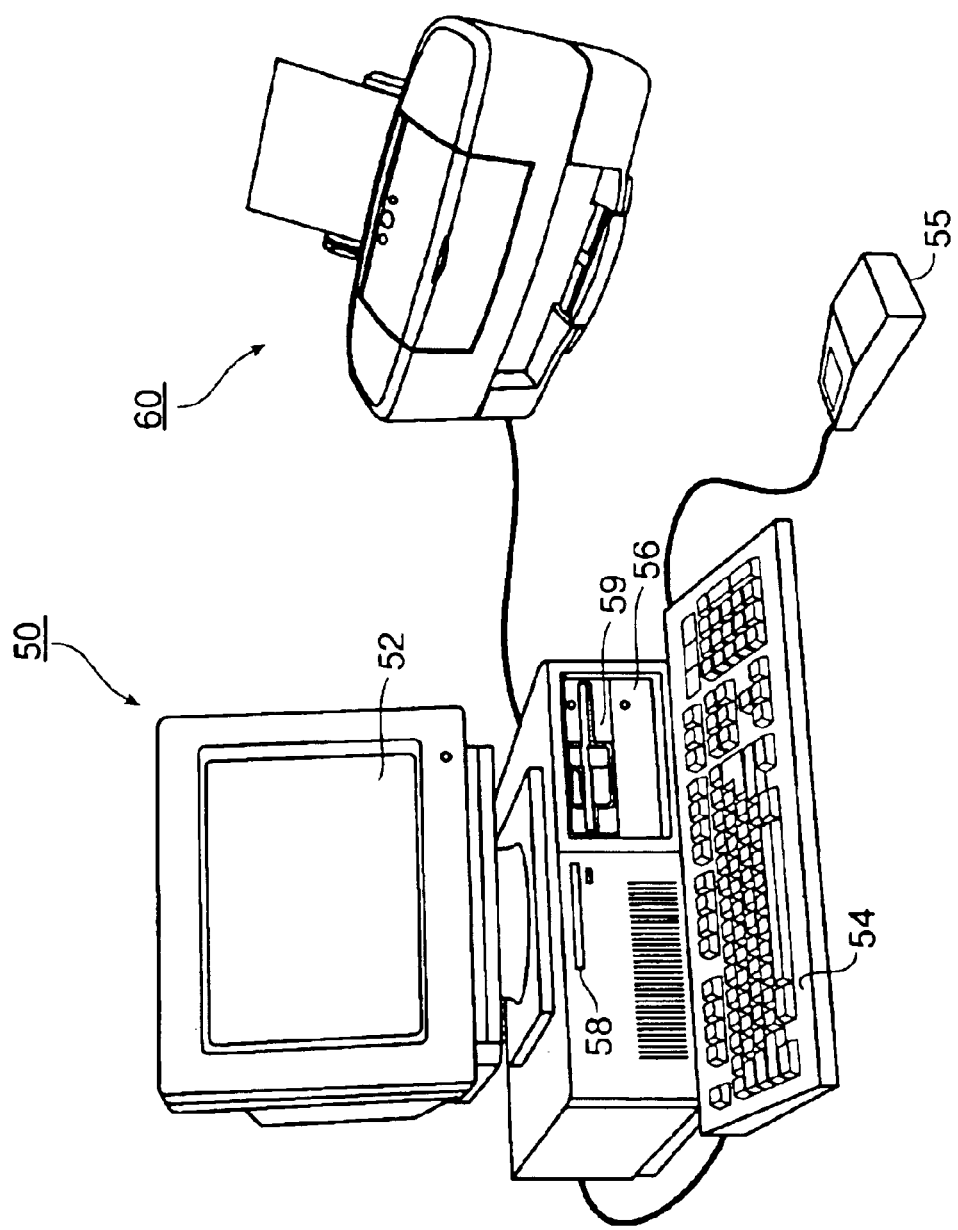
FIG. 7 is a representational view of a computer system to which an interface card according to the invention can be connected.

FIG. 7 is a representational view of another embodiment of the invention, showing an image output device that can be used with an interface card according to the invention. Shown in FIG. 7 is a computer system which can output images either through a display or a printer, and in which an interface card provides an interface between a CD-ROM drive and the computer system. It should be noted that while the following discussion describes the third embodiment with respect to a CD-ROM drive, the same discussion is equally applicable to other types of storage devices such as fixed disks, DVD drives, tape drives and the like.

Computer system 50 shown in FIG. 7 may be a Macintosh, PC-compatible, or other type of system having an operating system which preferably is a windowing operating system, such as Microsoft® Windows, but which may also be a non-windowing system such as DOS or UNIX. In the preferred embodiment, computer system 50 is a Pentium®-based computer system. It should be understood that, although a programmable general purpose computer system is shown in FIG. 7, a dedicated computer terminal or other type of data processing equipment can utilize the present invention.

Provided with computer system 50 are display 52 (which may be a color monitor) for displaying images, keyboard 54 for entering user commands, and pointing device 55 such as a mouse for pointing to and for manipulating graphical user interfaces and other objects displayed on display 52. Computer system 50 also includes a mass storage device such as fixed disk 56 for storing computer executable process steps for an operating system, device drivers, application programs, data and the like. Such storage may also be provided by CD-ROM drive 58. Floppy disk interface 59 provides an interface to floppy disks for removable storage.

Printer 60 is provided for outputting images for computer system 50. As mentioned above, images also can be output (i.e., displayed) by display 52.

Figure 8:
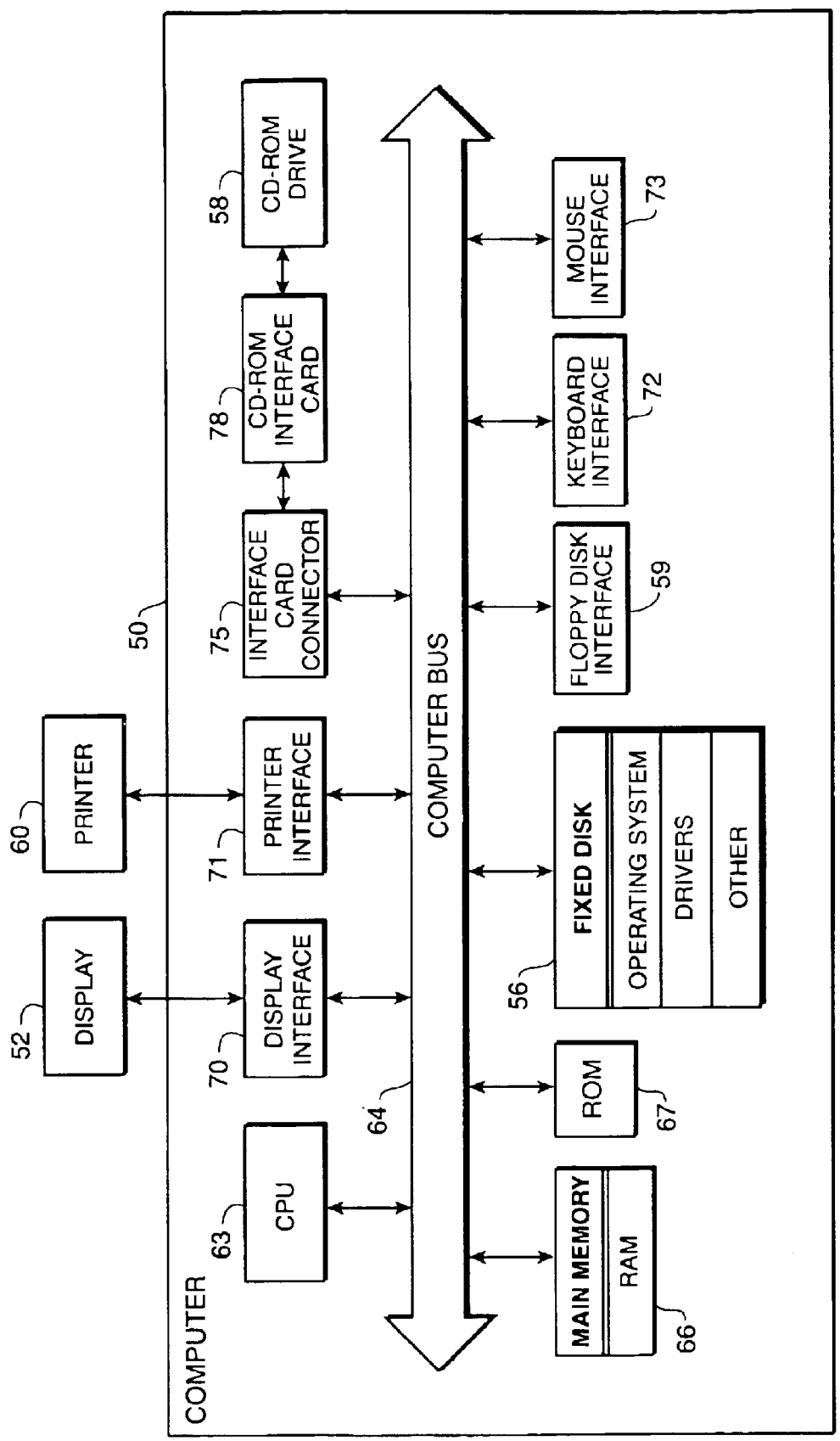
FIG. 8 is a block diagram of the computer system shown in FIG. 7 attached to a CD-ROM drive through a CD-ROM interface card according to the invention.

FIG. 8 is a block diagram of computer system 50 shown in FIG. 7 attached to a CD-ROM drive through a CD-ROM interface card according to the invention. As shown in FIG. 8, computer system 50 includes central processing unit (CPU) 63 which interfaces with computer bus 64. Also interfacing with computer bus 64 are fixed disk 56, main memory (RAM) 66, read only memory (ROM) 67, floppy disk interface 69, display interface 70 to display 52, printer interface 71 to printer 60, keyboard interface 72 to keyboard 54, mouse interface 73 to pointing device 55, and interface card connector 75 such as an EIDE or SCSI connector.

Main memory 66 interfaces with computer bus 64 so as to provide RAM storage to CPU 63 during execution of application programs. More specifically, CPU 63 loads process steps from fixed disk 56, another storage device such as CD-ROM drive 58, or some other source into main memory 66. CPU 63 then executes the stored process steps from main memory 66 in order to execute application programs.

As also shown in FIG. 8, fixed disk 56 typically contains an operating system, device drivers such as a display driver and a printer driver, and other files including application programs and data.

Interface card connector 75 provides a connection to devices connected to computer system 50. In FIG. 8, CD-ROM interface card 78 is connected to interface card connector 75 so as to provide an interface to CD-ROM drive 58. In the preferred embodiment, CD-ROM interface card 78 is installed inside computer system 50, although the CD-ROM interface card can be installed in a stand-alone CD-ROM drive device. According to the invention, CD-ROM interface card 78 sends data for output of an image of a quick-start guide to computer system 50 through interface card connector 75 once (unless reset with respect to sending the data) without error.

Figure 9:
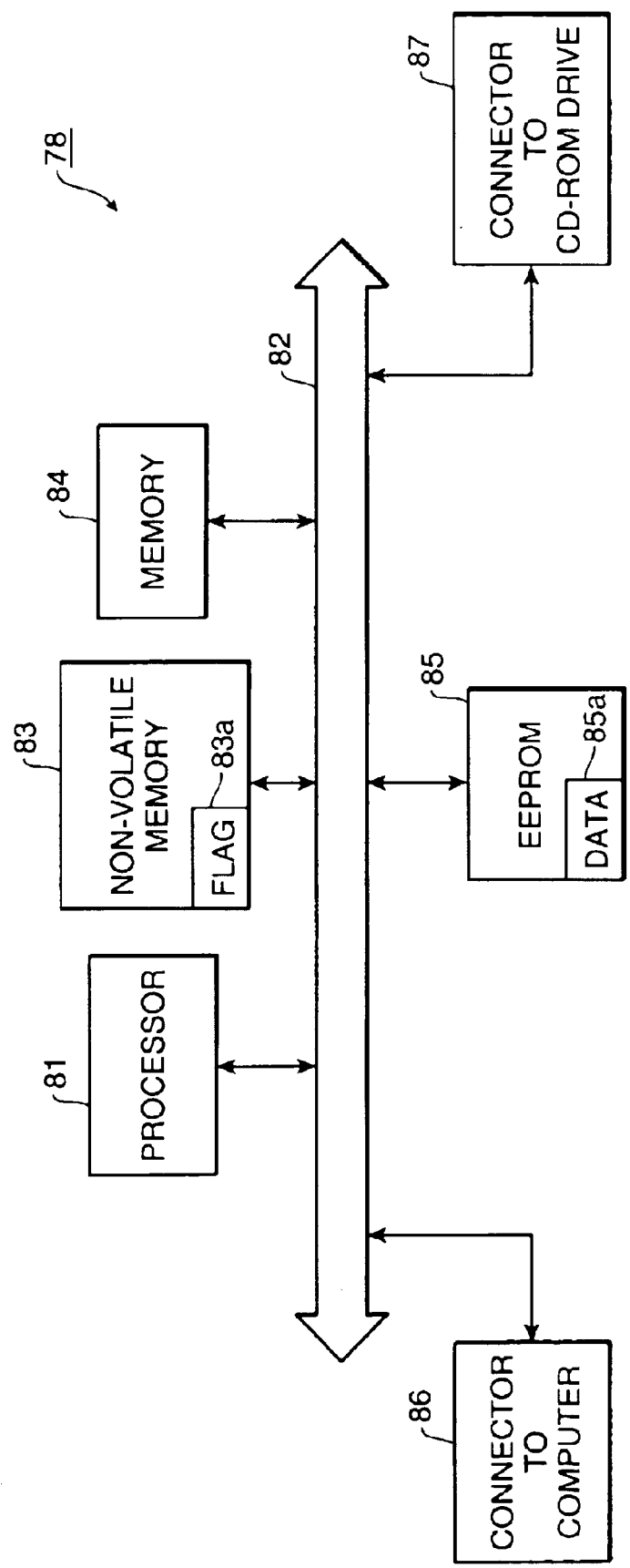
FIG. 9 is a block diagram of a CD-ROM interface card according to the invention.

FIG. 9 is a block diagram of CD-ROM interface card 78 according to the invention for interfacing computer system 50 to CD-ROM drive 58. As shown in FIG. 9, CD-ROM interface card 78 includes processor 81 such as an Intel 80188 8-bit programmable microprocessor which is interfaced to bus 82. This processor serves to provide the functionality needed to interface CD-ROM drive 58 to computer system 50. For example, processor 81 controls access to files and data stored on a CD-ROM inserted into CD-ROM drive 58. In addition, processor 81 serves as the controller for controlling output of data for an image of a quick-start guide according to the invention.

Also interfacing with bus 82 are non-volatile memory 83, memory 84, and EEPROM 85. Configuration parameters are stored in non-volatile memory 83, as well as an indication of whether data for output of an image of a quick-start guide has been sent from the CD-ROM interface card. This indication preferably is stored as flag 83a in non-volatile memory 83. Other information that must be preserved when the card is powered off is stored in non-volatile memory 83.

Process steps for execution by processor 81 are stored in EEPROM 85, but in general, those process steps are loaded into and executed out of memory 84. In addition, data 85a for output of the image of the quick-start guide also preferably is stored in EEPROM 85, and data 85a is loaded into memory 84 before being sent to connector 86 by processor 81. Data 85a preferably is an executable program which when executed by computer system 50 causes computer system 50 to output an image of the quick-start guide.

Connector 86 provides a connection to interface card connector 75 of computer 50. Likewise, connector 87 provides a connection to CD-ROM drive 58. In order to provide a user with information when CD-ROM interface card 78 is first installed, processor 81 sends data for output of an image of a quick-start guide to connector 86 when the CD-ROM interface card is first installed and powered on. The mechanism for sending this data is explained below with reference to FIG. 10.

Figure 10:
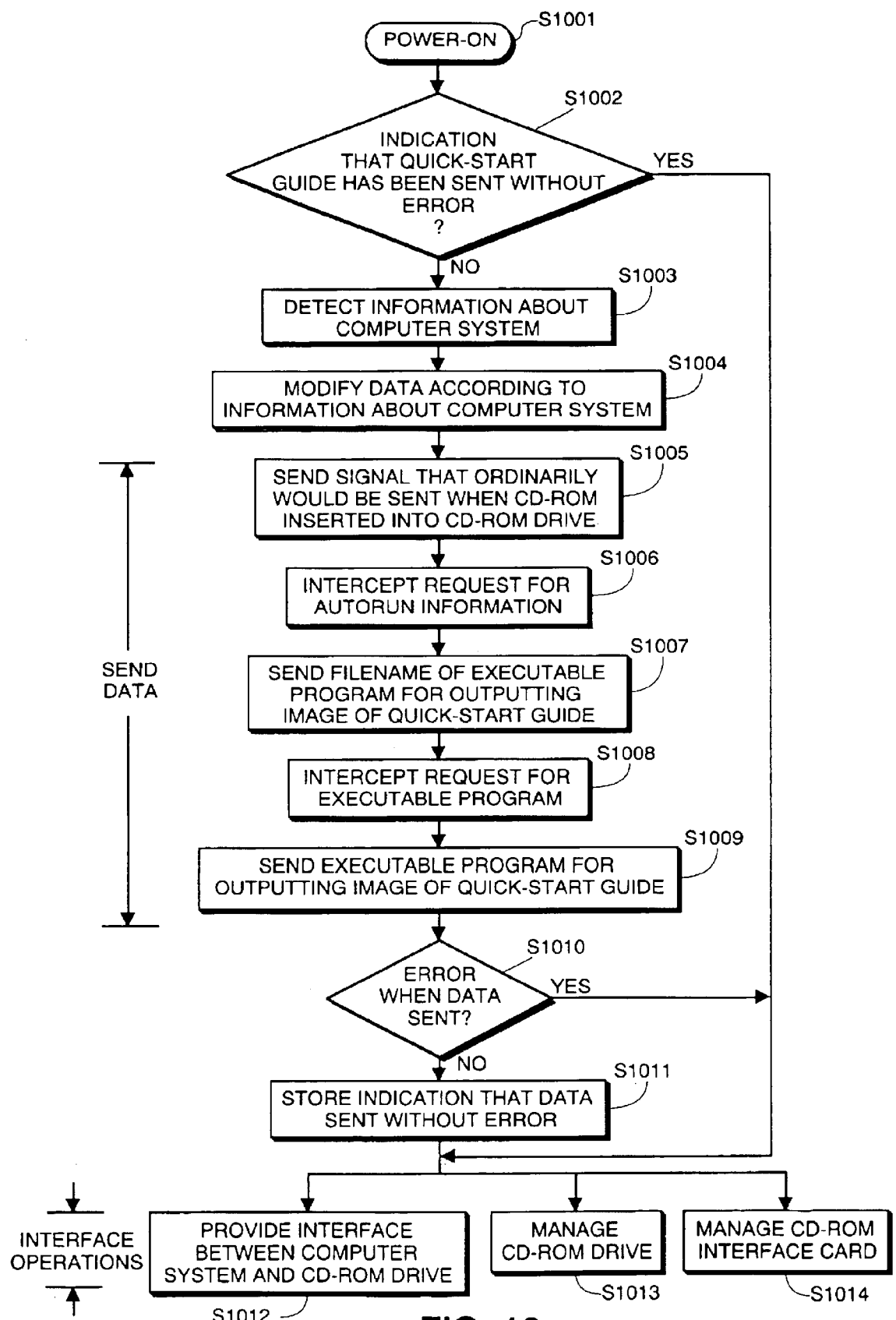
FIG. 10 is a flowchart for explaining the operation according to the invention of the CD-ROM interface card shown in FIG. 9.

FIG. 10 is a flowchart for explaining the operation of CD-ROM interface card 78 when sending data for output of an image of a quick-start guide by computer system 50. In step S1001, computer 50 is powered on, thereby providing power to CD-ROM interface card 78. In step S1002, after any POST operations, processor 81 accesses non-volatile memory 83 so as to determine if data for output of an image of a quick-start guide has been sent to connector 86, and thus to computer system 50. Processor 81 determines if the data has been sent by checking for an indication such as flag 83a in non-volatile memory 83. If such an indication exists, flow proceeds to the interface operations at the end of the flowchart, namely steps S1012 to S1014. If such an indication does not exist, flow proceeds to step S1003.

In step S1003, processor 81 preferably detects information about computer system 50 through connector 86. This information can include the status, type, model and/or manufacturer of computer system 50. In step S1004, processor 81 modifies data 85a based on the detected information. For example, if processor 81 detects that computer system 50 cannot output images through a printer, processor 81 can modify data 85a for output through a display.

In steps S1005 to S1009, processor 81 sends data for output of an image of a quick-start guide to connector 86. In more detail, in step S1005, processor 81 sends a signal to computer system 50 that ordinarily would be sent when a CD-ROM has been inserted into a CD-ROM drive connected to the CD-ROM interface card. This signal preferably is sent even if a CD-ROM drive is not connected to CD-ROM interface card 78. Computer system 50 interprets this signal to mean that a CD-ROM has newly been inserted into a CD-ROM drive, and computer system 50 responds accordingly.

Specifically, in response to such a signal, computer system 50 typically attempts to access what appears to the computer system to be a newly-inserted CD-ROM. Computer system 50 attempts to access the CD-ROM through CD-ROM interface card 78 so as to locate a filename for an executable program the should be run automatically. For example, if computer system 50 is running Windows® 95, computer system 50 attempts to access a file entitled "autorun.inf" on a newly-inserted CD-ROM. In Windows® 95, this "autorun.inf" file contains a filename for an executable program stored on the CD-ROM that should be run automatically. The filename for this executable program is often "autorun.exe".

In step S1006, processor 81 intercepts the request from computer system 50 for the filename. Then, in step S1007, processor 81 responds to this request by sending a filename for an executable program that resides in the CD-ROM interface card. When computer system 50 sends a request for the executable program with that filename, processor 81 intercepts that request in step S1008. In step S1009, processor 81 sends the executable program stored in data 85a to computer system 50 through connector 86. When computer system 50 receives the executable program from connector 86 and runs the program, computer system 50 outputs an image of the quick-start guide, either through display 52 or through printer 60, using the display or print drivers on disk 56.

In the preferred embodiment, the application program contains the data for the image. Alternatively, the executable program can request the data from CD-ROM interface card 78. In any case, once the executable program is sent to connector 86 without error, flow proceeds to step S1010.

Processor 81 in step S1010 determines if the data was sent to computer system 50 without error. If the data was sent without error, flow proceeds to step S1011. Otherwise, if an error occurred, flow branches to steps S1012 through S1014, skipping step S1011. As a result, the data for output of an image of the quick-start guide is sent again the next time CD-ROM interface card 78 is powered on.

In step S1011, processor 81 stores an indication such as flag 83a that the print job was sent without error. This indication is stored in non-volatile memory 83. As a result, the next time CD-ROM interface card 78 is powered on, flow proceeds from step S1002 to steps S1012 through S1014, unless the indication is reset in step S1014 discussed below.

After step S1011, flow proceeds to steps S1012 through S1014, which preferably occur in parallel. In steps S1012 through S1014, CD-ROM interface card 78 performs normal interface operations.

In more detail, in step S1012, CD-ROM interface card 78 provides computer system 50 with an interface to CD-ROM drive 58. This interface allows computer system 50 to access CD-ROMs inserted into CD-ROM drive 58, for example to load programs and data from a CD-ROM.

In step S1013, CD-ROM interface card 78 manages CD-ROM drive 58. For example, CD-ROM interface card 78 changes the access speed of the CD-ROM drive and controls access timing for accessing information on CD-ROMs.

In step S1014, CD-ROM interface card 78 is itself managed. The management of CD-ROM interface card 78 in step S1014 includes changing configuration information for the CD-ROM interface card. The configuration information preferably is changed though flashing or reloading non-volatile memory 83. If flag 83a is reset by this flashing or reloading operation, CD-ROM interface card 78 is reset with respect to whether data for outputting an image of a quick-start guide has been sent. As a result, the next time CD-ROM interface card 78 is powered on, data for output of an image of the quick-start guide is again sent to computer system 50.

In an alternative embodiment, CD-ROM interface card 78 and CD-ROM drive 58 are replaced with a DVD interface card and a DVD drive. In that case, operation proceeds substantially the same as described above with respect to the CD-ROM example.

Fourth Embodiment

Figure 11:
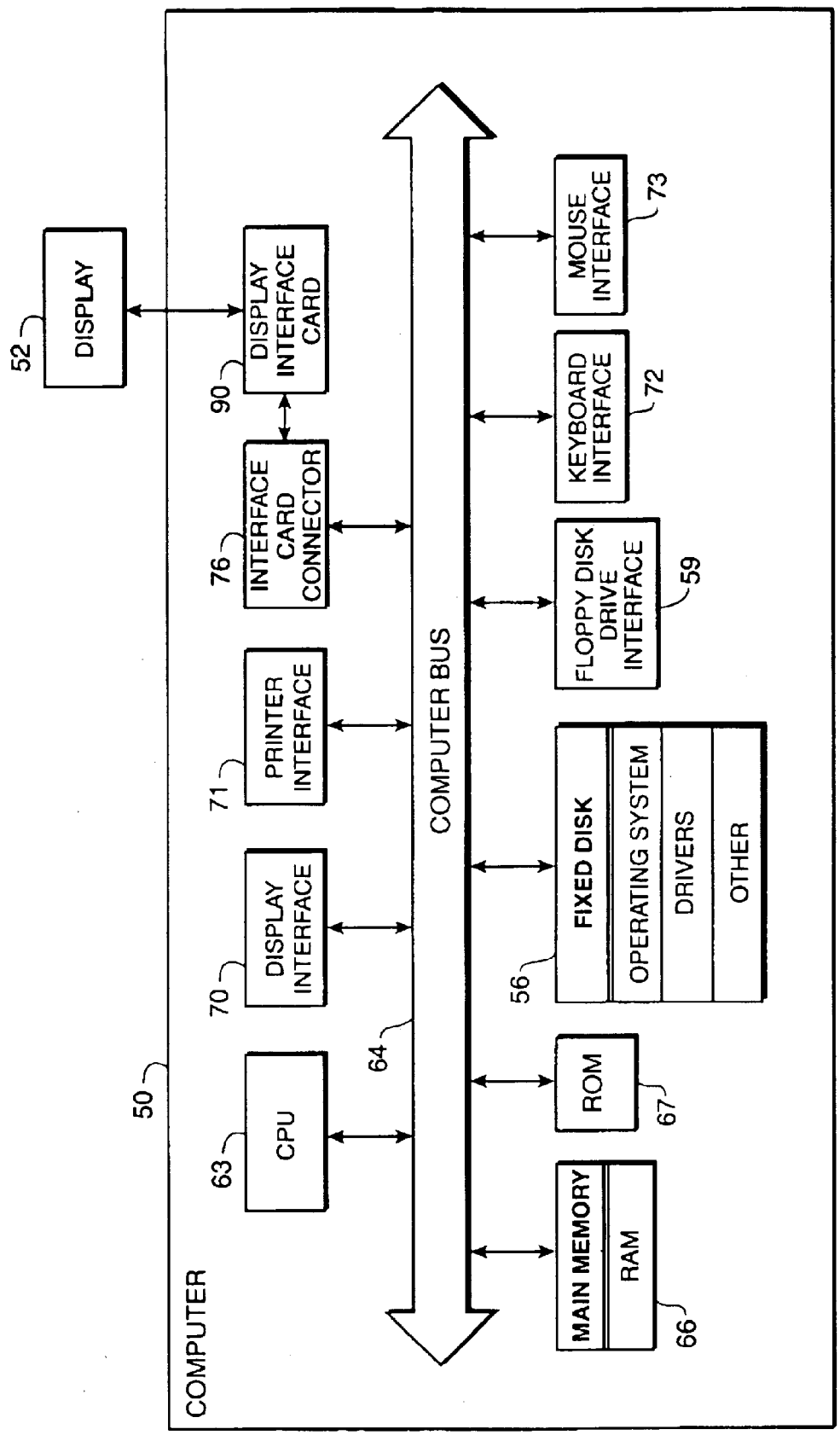
FIG. 11 is a block diagram of the computer system shown in FIG. 7 attached to a display through a display interface card (e.g., a graphics accelerator card) according to the invention.

FIG. 11 is a block diagram of yet another embodiment of the invention, in this case a computer system attached to a display through a display interface card according to the invention. The structure of computer system 50 in FIG. 11 is substantially identical to the structure shown in FIG. 8, except that display 52 is interfaced to computer system 50 through display interface card 90. An example of such a display interface card is a graphics accelerator card.

Accordingly, computer system 50 shown in FIG. 11 includes CPU 63, fixed disk 56, and main memory 66, all interfaced to computer bus 64. As explained above, CPU 63 loads process steps from fixed disk 56, another storage device, or some other source into main memory 66, and then executes the stored process steps from main memory 66 in order to execute application programs.

Also interfaced to computer bus 64 are floppy disk interface 59, ROM 67, display interface 70, printer interface 71, keyboard interface 72, mouse interface 73 and interface card connector 76. Interface card connector 76 preferably is an expansion slot such as a PCI or an ISA slot.

Display 52 is connected to computer system 50 through display interface card 90, which in turn is connected to interface card connector 76. Because display 52 is connected through display interface card 90, display interface 70 is unused.

Figure 12:
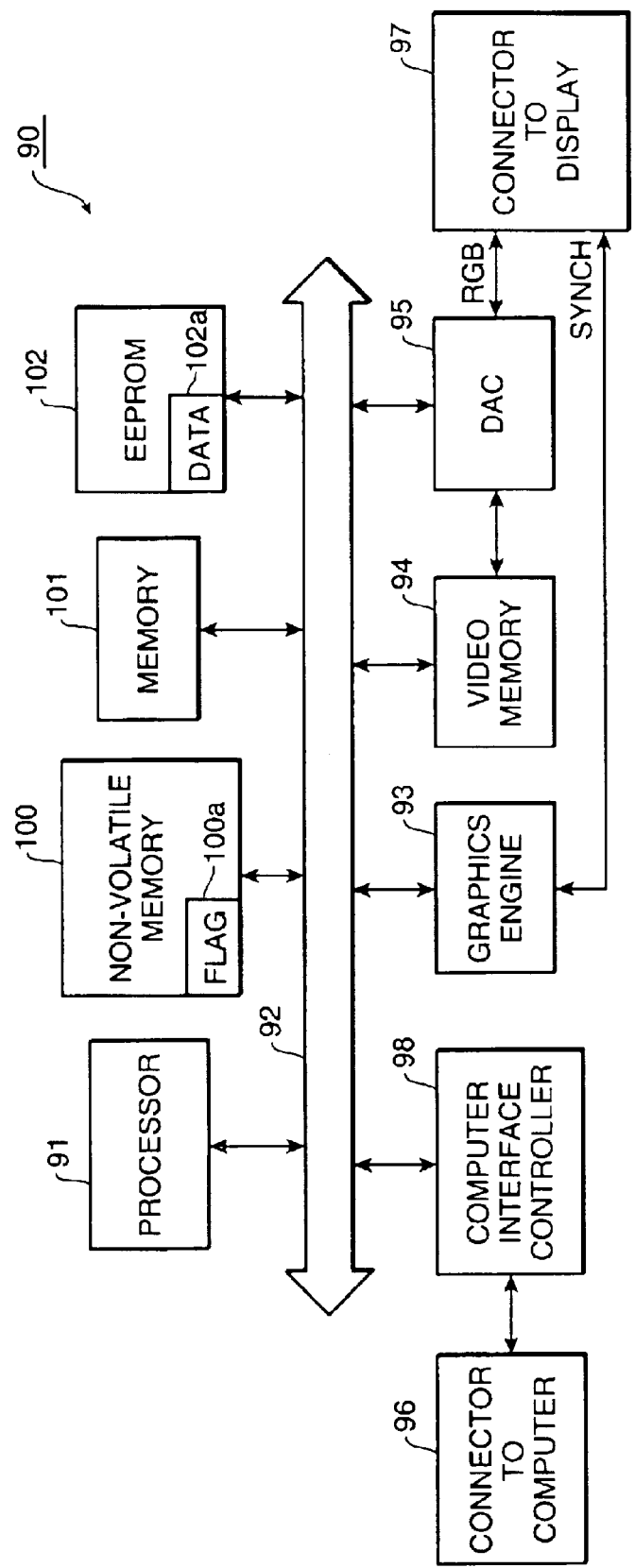
FIG. 12 is a block diagram of a display interface card according to the invention.

FIG. 12 is a block diagram of display interface card 90 according to the invention for interfacing display 52 to computer system 50. An example of such a display interface card is a graphics accelerator card.

As shown in FIG. 12, display interface card 90 includes processor 91 such as an Intel 80188 8-bit programmable microprocessor which is interfaced to bus 92. Also interfaced to bus 92 are graphics engine 93, video memory 94, and digital to analog converter (DAC) 95.

Processor 91 and graphics engine 93 operate to store video data in video memory 94 in response to graphics commands received from computer system 50 through connector 96. In addition, processor 91 serves as the controller for controlling output of data for an image of a quick-start guide according to the invention.

DAC 95 operates under the control of processor 91 to convert digital data in video memory 94 into analog red, green and blue (RGB) color pixel information for display by display 52. This RGB pixel information is sent to display 52 through connector 97, along with synch information generated by graphics engine 93.

Also interfacing with bus 92 are non-volatile memory 100, memory 101, and EEPROM 102. Configuration parameters are stored in non-volatile memory 100, as well as an indication of whether data for output of an image of a quick-start guide has been sent from the display interface card. This indication is preferably stored as flag 100a in non-volatile memory 100. Other information that must be preserved when the card is powered off is stored in non-volatile memory 100.

Process steps for execution by processor 91 are stored in EEPROM 102, but in general, those process steps are loaded into and executed out of memory 101. In addition, data 102a for output of the image of the quick-start guide also preferably is stored in EEPROM 102. Data 102a is loaded into video memory 94, where it is output by DAC 95 through connector 97 to display 52 in the form of RGB and synch information.

Figure 13:
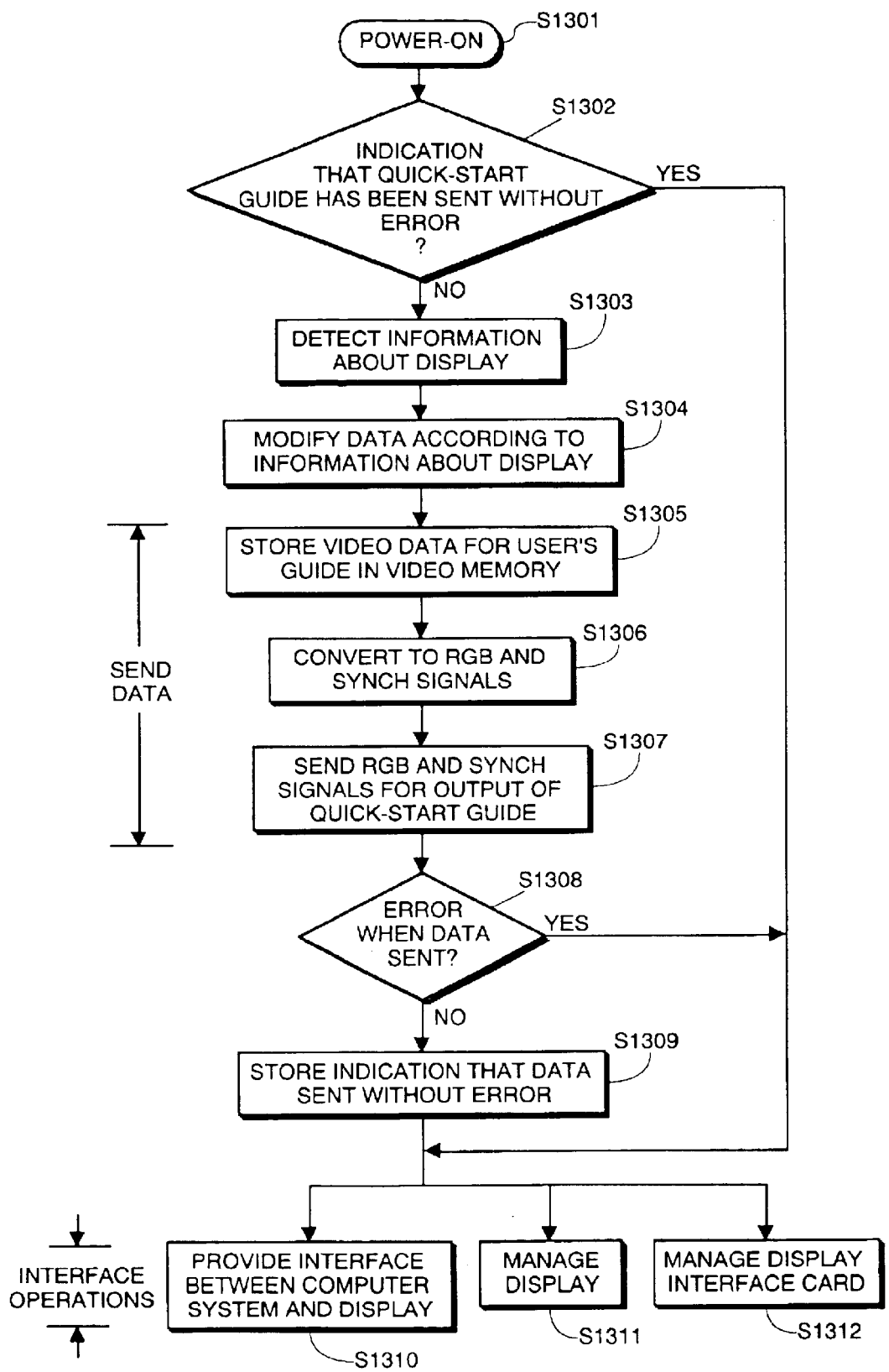
FIG. 13 is a flowchart for explaining the operation according to the invention of the display interface card shown in FIG. 12.

FIG. 13 is a flowchart for explaining the operation of display interface card 90 when sending data for output of an image of a quick-start guide by display 52. In step S1301, computer system 50 is powered on, thereby providing power to display interface card 90. In step S1302, after any POST operations, processor 91 accesses non-volatile memory 100 so as to determine if data for output of an image of a quick-start guide has been sent to connector 97, and thus to display 52. Processor 91 determines if the data has been sent by checking for an indication such as flag 100a in non-volatile memory 100. If such an indication exists, flow proceeds to the interface operations at the end of the flowchart, namely steps S1310 through S1312. If such an indication does not exist, flow proceeds to step S1303.

In steps S1303, processor 91 preferably detects information about display 52 through connector 97. This information can include the status, type, model and/or manufacturer of display 52. In step S1304, processor 91 modifies data 102a based on the detected information.

For example, if processor 91 detects that display 52 has a maximum screen size of 800 pixels by 600 pixels, processor 91 modifies data 102a so as to ensure that an image of the quick-start guide fits within that screen size.

In steps S1305 to S1307, processor 91 sends data in the form of RGB and synch information for output of an image of a quick-start guide to connector 97. This information causes display 52 to output an image of the quick-start guide.

In more detail, in step S1305, processor 91 stores data 102a from EEPROM 102 into video memory 94. In step S1306, DAC 95 converts the data in video memory 94 into RGB pixel information. At the same time, CPU 91 controls graphics engine 93 so as to generate synch information for outputting the image of the quick-start guide. The RGB and synch information is sent to connector 97 in step S1307, causing the image of the quick-start guide to be output by display 52.

Processor 91 in step S1308 determines if the RGB and synch information was sent to display 52 without error. If the information was sent without error, flow proceeds to step S1309. Otherwise, if an error occurred, flow branches to steps S1310 through S1312, skipping step S1309. As a result, the data for output of an image of the quick-start guide is sent again the next time display interface card 90 is powered on.

In step S1309, processor 91 stores an indication such as flag 100a that the RGB and synch information was sent without error. This indication is stored in non-volatile memory 100. As a result, the next time display interface card 90 is powered on, flow proceeds from step S1302 to steps S1310 through S1312, unless the indication is reset in step S1312 discussed below.

After step S1309, flow proceeds to steps S1310 through S1312, which preferably occur in parallel. In steps S1310 through S1312, display interface card 90 performs normal interface operations.

In more detail, in step S1310, display interface card 90 provides computer system 50 with an interface to display 52. This interface allows computer system 50 to output images using display 52, preferably in a manner that is in some fashion superior to the manner possible using display interface 70.

In step S1311, display interface card 90 manages display 52. For example, display interface card 90 changes the displayable screen size (in pixels), the refresh rate, and the mode of the display.

In step S1312, display interface card 90 is itself managed. The management of display interface card 90 in step S1312 includes changing configuration information for the display interface card. The configuration information preferably is changed though flashing or reloading non-volatile memory 100. If flag 100a is reset by this flashing or reloading operation, display interface card 90 is reset with respect to whether data for outputting an image of a quick-start guide has been sent. As a result, the next time display interface card 90 is powered on, data for output of an image of the quick-start guide is again sent to display 52.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. An interface card for a device with image output capabilities, comprising:
   a connector for connecting to the device;
   a controller for sending a predetermined signal to the device, receiving a request from the device for an executable program, and sending data for output of an image of a quick-start guide from the interface card to the device through the connector in response to the request for the executable program,
   wherein the quick-start guide identifies installation and configuration instructions.

2. The interface card according to claim 1, further including a non-volatile memory,
   wherein the controller stores an indication in the non-volatile memory that the data has been sent without error in a case that the data has been sent without error,
   wherein the interface card uses the indication to determine if the quick-start guide has been sent once without error, and
   wherein the interface card is reset with respect to whether the data has been sent by resetting the indication.

3. An interface card according to claim 1, wherein the controller sends the signal that would be sent when a memory medium has been inserted in to a memory medium drive, receives a request from the device for a filename for the executable program, sends a predetermined filename for the data for output of the image of the quick-start guide to the device in response to the request for the filename, receives another request from the device for the executable program based on the predetermined filename, sends the data for the output of the image of the quick-start guide in response to the other request for the executable program.

4. An interface card according to claim 2, wherein the interface card comprises a CD-ROM interface card, and the device comprises a computer system.

5. An interface card according to claim 4, wherein the computer system has a display connected thereto, and wherein the image of the quick-start guide is output through the display.

6. An interface card according to claim 4, wherein the computer system has a printer connected thereto, and wherein the image of the quick-start guide is output through the printer onto a recording medium.

7. An interface card according to claim 2, wherein the interface card comprises a DVD interface card, and the device comprises a computer system.

8. An interface card according to claim 2, wherein the interface card comprises a display interface card, and the device comprises a display that is connectable to a computer system through the display interface card.

9. An interface card according to claim 8, wherein the data comprises RGB pixel information and synch information.

10. An interface card according to claim 2, wherein the controller also detects if the data is sent without error.

11. An interface card according to claim 2, wherein the controller detects information about the device and modifies the data in accordance with the detected information.

12. An interface card according to claim 2, wherein the non-volatile memory comprises a NVRAM.

13. An interface card according to claim 12, wherein the NVRAM stores firmware for the interface card, and wherein in a case the firmware is updated by reloading the NVRAM, the indication that the data has been sent without error is reset.

14. An interface card according to claim 2, wherein the non-volatile memory comprises an EEPROM.

15. An interface card according to claim 14, wherein the EEPROM stores firmware for the interface card, and wherein in a case the firmware is updated by flashing the EEPROM, the indication that the data has been sent without error is reset.

16. An interface card according to claim 2, wherein the device has a housing and wherein the interface card is disposed within the housing.

17. An interface card according to claim 2, wherein the device has a housing and where the interface card has a housing different than the housing for the device.

18. A method for outputting a quick-start guide, said method comprising the steps of:
   sending a signal to a computer system that ordinarily would be sent when a memory medium has been inserted into a memory medium drive, wherein the signal is sent when no memory medium is inserted into the memory medium drive;
   intercepting a request from the computer system for a filename for an executable program;
   sending the filename for the executable program to the computer system in response to the request for the filename;
   intercepting a request from the computer system for the executable program; and
   sending the executable program to the computer system in response to the request for the executable program,
   wherein when the computer system executes the executable program, the executable program causes the computer system to output an image of the quick-start guide,
   wherein the quick-start guide identifies installation and configuration instructions.

19. A method according to claim 18, further comprising:
   detecting information about a device,
   wherein said image of the quick-start guide is based on the detected information.

20. A method according to claim 18, further comprising:
   storing an indication in non-volatile memory that the executable program has been sent without error in a case that the data has been sent without error,
   wherein the indication is used to determine if the executable program has been sent once without error.

21. A method according to claim 18, wherein the computer system has a display connected thereto, and wherein the image of the quick-start guide is output through the display.

22. A method according to claim 18, wherein the computer system has a printer connected thereto, and wherein the image of the quick-start guide is output through the printer onto a recording medium.

23. A method according to claim 18, wherein the memory medium is a CD-ROM and the memory medium drive is a CD-ROM drive.

24. An apparatus for outputting a quick-start guide, said apparatus comprising:
   a program memory for storing process steps executable to: (1) send a signal to a computer system that ordinarily would be sent when a memory medium has been inserted into a memory medium drive, wherein the signal is sent when no memory medium is inserted into the memory medium drive; (2) intercept a request from the computer system for a filename for an executable program; (3) send the filename for the executable program to the computer system in response to the request for the filename; (4) intercept a request from the computer system for the executable program; and (5) send the executable program to the computer system in response to the request for the executable program, wherein when the computer system executes the executable program, the executable program causes the computer system to output an image of the quick-start guide, and wherein the quick-start guide identifies installation and configuration instructions; and a processor for executing the process steps stored in said program memory.

* * * * *

UNITED STATES PATENT AND TRADEMARK OFFICE
CERTIFICATE OF CORRECTION

PATENT NO. : 6,954,279 B2  Page 1 of 1
DATED : October 11, 2005
INVENTOR(S) : Don Hideyasu Matsubayashi It is certified that error appears in the above-identified patent and that said Letters Patent is hereby corrected as shown below:

<u>Column 16,</u>
Line 65, "when no memory medium is inserted" should read -- without inserting the memory medium --.

Signed and Sealed this

Fourth Day of April, 2006

JON W. DUDAS
*Director of the United States Patent and Trademark Office*